United States Patent
Simon

[19]

[11] Patent Number: 5,806,820
[45] Date of Patent: Sep. 15, 1998

[54] DEVICE FOR SECURING HORIZONTAL BRACKETS ON A VERTICLE UPRIGHT INCORPORATING A RACK

[75] Inventor: Bernard Simon, Caluire, France

[73] Assignee: Mavil, Liernais, France

[21] Appl. No.: 665,971

[22] Filed: Jun. 21, 1996

[30] Foreign Application Priority Data

Jun. 27, 1995 [FR] France .................................. 95 07957

[51] Int. Cl.$^6$ .................................................. A47G 29/02
[52] U.S. Cl. ................. 248/243; 248/221.4; 248/222.52; 211/192
[58] Field of Search .............................. 248/243, 218.4, 248/223.41, 247, 248, 222.51, 222.52; 211/207, 206, 191, 192, 189, 193, 204, 208

[56] References Cited

U.S. PATENT DOCUMENTS

| | | | |
|---|---|---|---|
| 2,872,144 | 2/1959 | Hobson | 248/218.4 |
| 3,080,980 | 3/1963 | Gibbons | 248/222.52 |
| 3,127,995 | 4/1964 | Mosinski | 211/191 |
| 4,156,515 | 5/1979 | Mochly | 211/193 |
| 4,285,436 | 8/1981 | Ronstant et al. | 211/192 |
| 4,342,397 | 8/1982 | Halstrick | 211/191 |
| 4,378,925 | 4/1983 | Griffin | 248/248 |
| 4,674,723 | 6/1987 | Bayuk | 248/247 |
| 5,092,546 | 3/1992 | Wolfbauer | 248/49 |
| 5,318,264 | 6/1994 | Meista | 248/248 |

FOREIGN PATENT DOCUMENTS

| | | | |
|---|---|---|---|
| 2234503 | 1/1995 | France . | |
| 3606505 | 5/1987 | Germany . | |
| 605669 | 7/1948 | United Kingdom | 248/73 |
| 141991 | 9/1953 | United Kingdom | 211/60.1 |
| WO9304612 | 3/1993 | WIPO | 248/218.4 |

*Primary Examiner*—Leslie A. Braun
*Assistant Examiner*—Kimberly T. Wood
*Attorney, Agent, or Firm*—Dowell & Dowell, P.C.

[57] ABSTRACT

A device for securing brackets on an upright member wherein the upright member includes two spaced flanges having ends bent inwardly to form curved end portions defining an opening therebetween. Each curved end portion includes a series of notches forming a rack over the length of the upright member. At least one bracket is provided which includes opposite end spaced retaining members which cooperate with the curved end portions, the notches and the continuous opening of the upright to retain the at least one bracket to the upright member.

15 Claims, 3 Drawing Sheets

5,806,820

DEVICE FOR SECURING HORIZONTAL BRACKETS ON A VERTICLE UPRIGHT INCORPORATING A RACK

FIELD OF THE INVENTION

The present invention relates to a device for securing horizontal brackets on vertical uprights for positioning cable ways or any other conduits for conveying energy or fluids.

HISTORY OF THE RELATED ART

Devices of this type are known, which comprise a vertical upright presenting a C-section, whose ends are slightly closed so as to constitute a slideway. Inside the slideway are fixed brackets in the form of angles so that their horizontal faces are perpendicular to the web of the upright. The brackets are retained via screws which enable them to be gripped against the web of the upright and the ends of the C-section. In certain cases, the brackets may be mounted one opposite the other, i.e. head to tail. To that end, the vertical upright presents a double-C section whose edges are slightly closed to constitute a slideway on each of the faces of the upright.

Such devices present certain drawbacks concerning their manufacturing costs and their complex assembly when securing the brackets when they are disposed in the slideways of the C-sectioned upright.

It is a particular object of the present invention to overcome these drawbacks.

The purpose of the securing device according to the present invention is to allow fixation of at least one bracket by clipping on a vertical upright, avoiding any use of screws and nuts.

SUMMARY OF THE INVENTION

To that end, the device according to the invention comprises a vertical upright provided with a web from which extend perpendicularly two flanges parallel to each other, whose ends are bent inwardly of the upright to constitute edges of curved profile defining a continuous and vertical opening while curved-profile edge is cut out to present a series of parallel notches forming a rack over the whole height of the upright. At least one horizontal bracket is provided which comprises opposite clipping and retaining means which cooperate with the curved-profile edges, the notches and the continuous opening in order to immobilize the bracket on the vertical upright.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
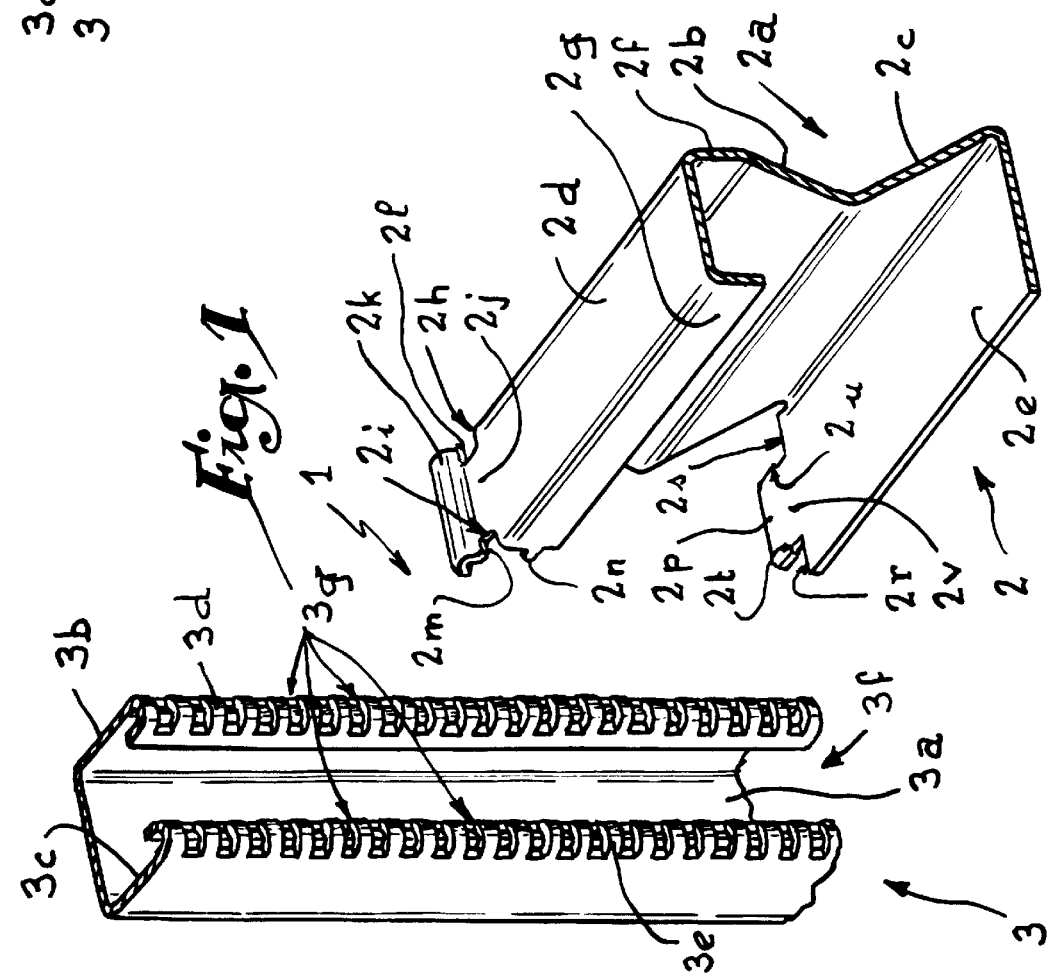
FIG. 1 is an exploded view in perspective illustrating the securing device according to the present invention.

Referring now to the drawings, FIG. 1 shows a device for securing horizontal brackets 2 on a vertical upright 3.

Bracket 2 comprises a vertical face 2a formed by two inclined panels 2b and 2c which extend respectively in a horizontal and parallel flange 2d and 2e. The upper flange 2d is joined to the inclined panel 2b by a vertical portion 2f. Opposite portion 2f and parallel thereto, the upper flange 2d extends in a return lip 2g which is directed towards the lower flange 2e. The upper flange 2d, the portion 2f and the return lip 2g are cut out at one of the ends of the bracket 2 to present two notches 2h and 2i defining a horizontal branch 2j. The horizontal branch or segment 2j is provided to be in line with the upper flange 2d and to be of shorter width.

The branch or segment 2j comprises, perpendicularly to its longitudinal axis, a stop or retainer 2k of curved profile, or the like, forming the first means for clipping and retaining the bracket 2. The stop 2k is provided to present a width equivalent to that of the upper flange 2d to constitute with the notches 2h and 2i two bearing edges 2l and 2m.

Portion 2f and return 2g respectively comprise in their extension towards the curved stop 2k and therebelow, a retaining finger 2n.

The lower flange 2e is cut out to constitute a lug or retainer 2p forming the second means for clipping and retaining the bracket 2. Lug 2p lies in line with the lower flange 2e and in the same horizontal plane.

Lug 2p is in the form of a T and constitutes with the lower flange 2e, on the one hand, two bearing faces 2r, 2s forming part of the flange and, on the other hand, two other bearing faces 2t and 2u opposite the first two and forming part of the lug. The bearing faces 2r, 2s and 2t, 2u are respectively separated by a segment 2v whose width is less than that of the lug 2p.

The vertical upright 3 comprises a web 3a from which extend perpendicularly two flanges 3b and 3c which are parallel to each other. Opposite the web 3a, the free ends of the flanges 3b and 3c are bent towards the inside of the upright 3 to constitute edges 3d and 3e of curved profile. The curved-profile edges 3d and 3e of each flange 3b and 3c define over the whole height of the upright 3 a continuous and vertical opening 3f. Each edge 3d and 3e is cut out to present include a series of notches 3g parallel to one another, forming a rack over the whole height of the upright 3.

It will be noted that the notches 3g made on each of the curved-profile edges 3d and 3e open out inside the fold thereof to communicate with the inner part of the upright 3. The height of the notches 3g is slightly greater than that of the thickness of the section forming the bracket 2 and of the retaining fingers 2n.

It will be observed that the width of the continuous opening 3f is less than that of the stop 2k and of lug 2p.

Figure 2:
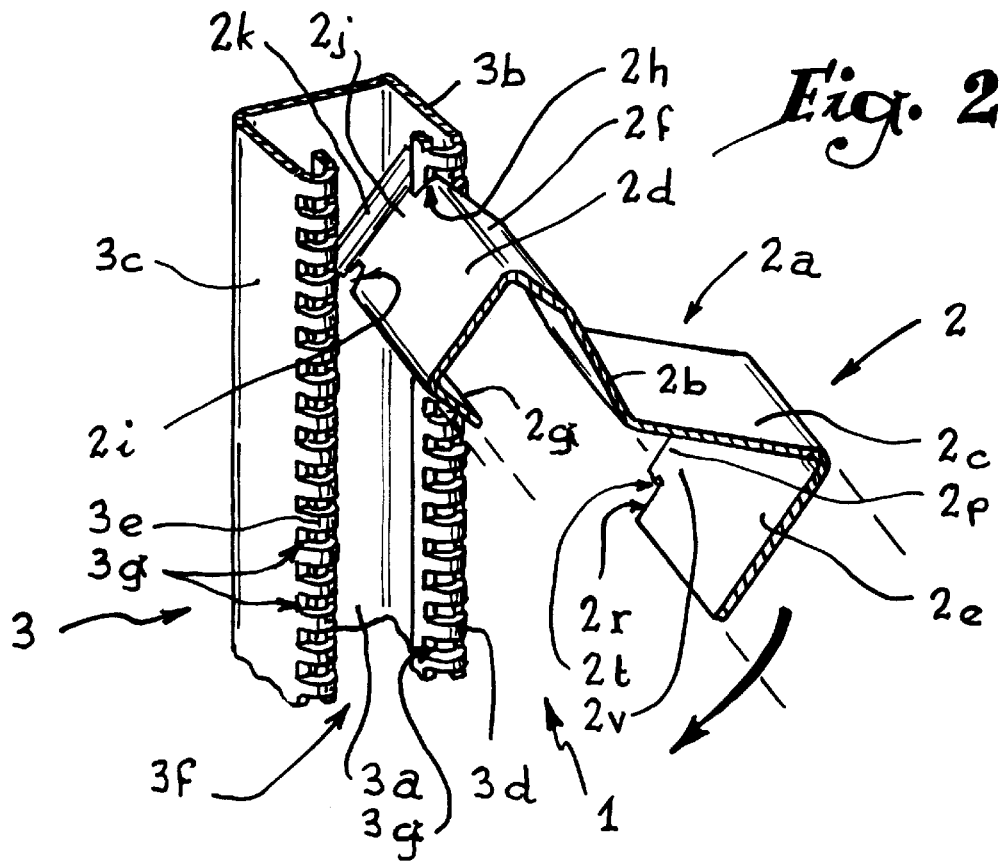
FIGS. 2 and 3 are views representing the positioning of the horizontal brackets on a vertical upright.
Figure 3:
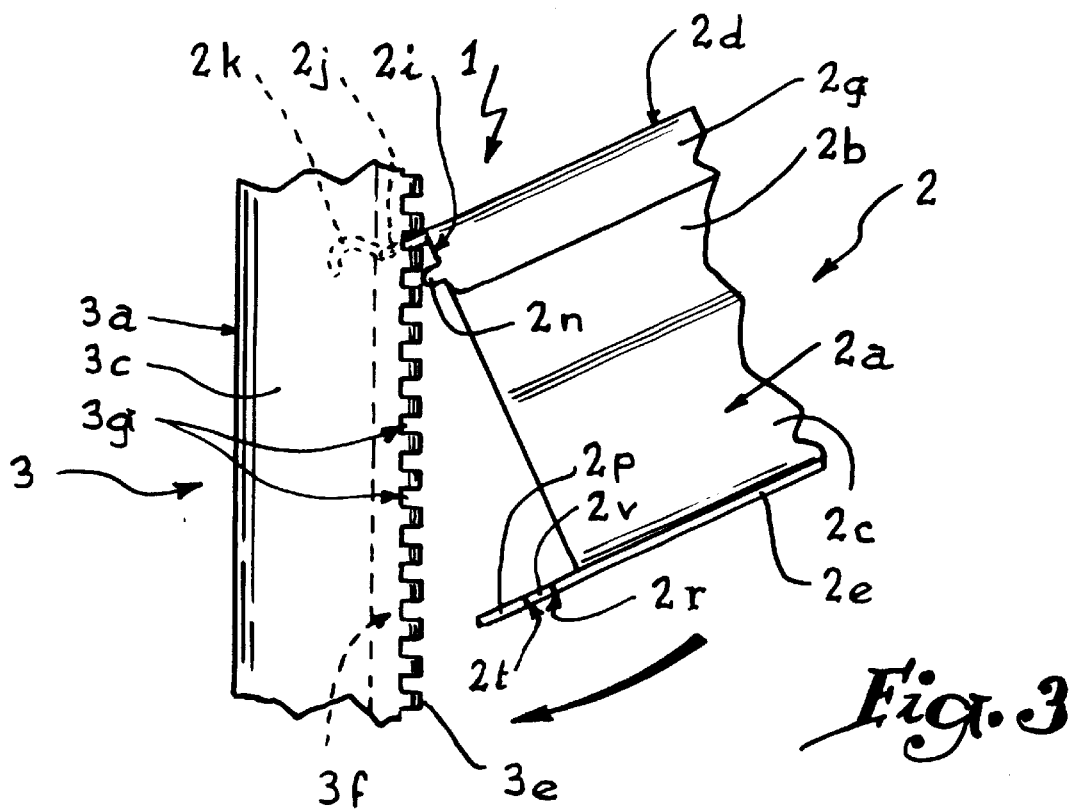

FIGS. 2 and 3 illustrate the positioning of a bracket 2 on an upright 3.

It will be noted that bracket 2 must be inclined simultaneously in two successive planes with respect to the upright 3 in order to be able to introduce the curved stop 2k inside the continuous opening 3f. In fact, a first end of the curved stop 2k is offered inside the opening 3f and it is then pivoted about its axis so that the other end is introduced inside said opening and in the inner part of the upright 3.

Bracket 2 is then tipped downwardly so that the second clipping and retaining means constituted by the lug 2p penetrates by force inside the opening 3f with a view to immobilizing bracket 2.

Figure 4:
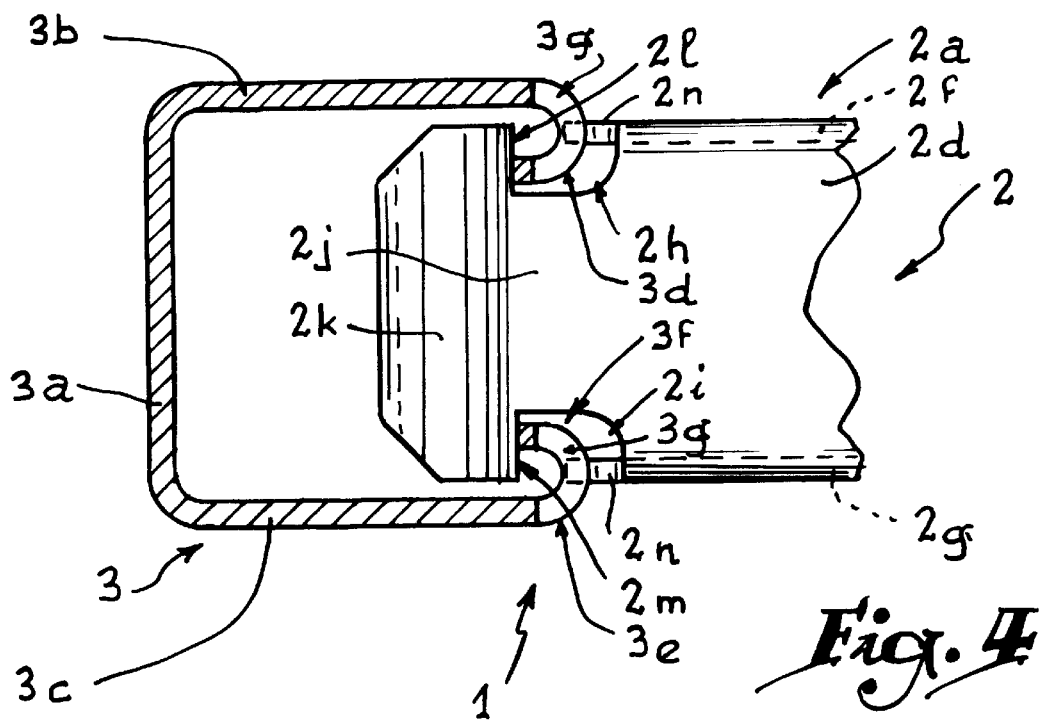
FIG. 4 is a plan view illustrating the first means for retaining the horizontal bracket on the vertical upright.

FIG. 4 shows the positioning of the first means constituted by the curved stop 2k inside the upright 3. It will be noted that the end edges 2l and 2m of the curved stop 2k abut on the free, inner ends 3h of the curved-profile edges 3d and 3e of each of the flanges 3b and 3c, while the retaining fingers 2n each penetrate inside a corresponding notch 3g located at the same level.

Figure 5:
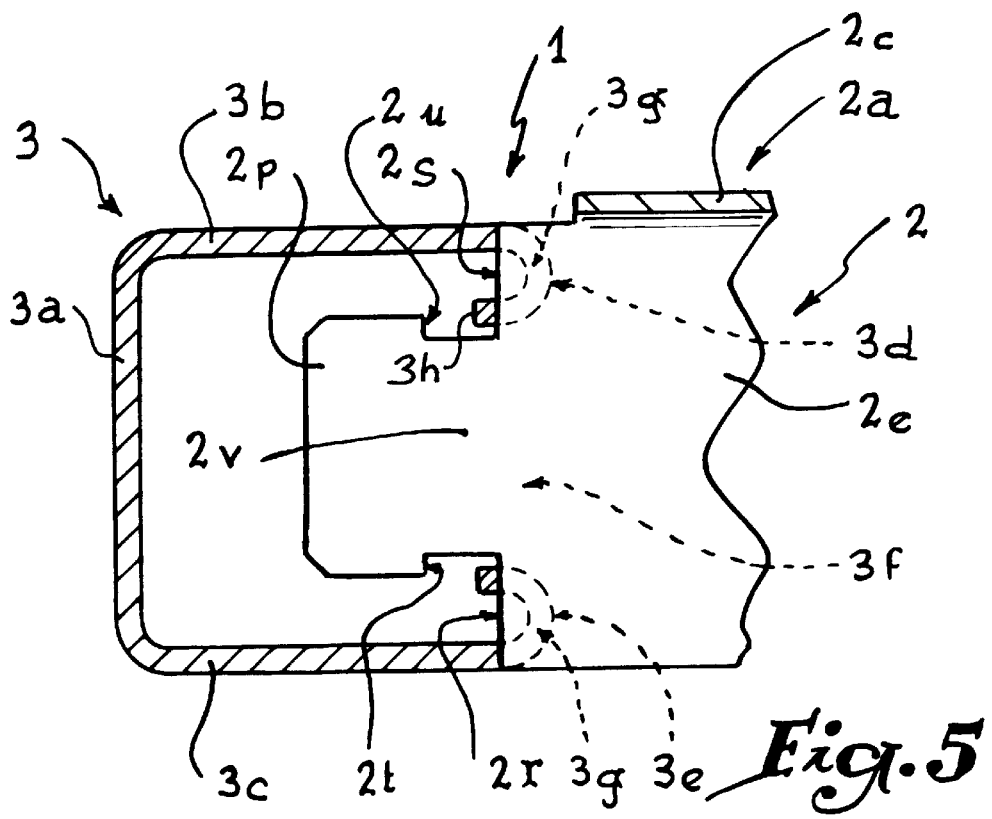
FIG. 5 is a plan view showing the second means for retaining she bracket on the vertical upright.

FIG. 5 represents the positioning of the second clipping and retaining means constituted by the lug 2p inside the upright 3. It will be noted that the width of the lug, greater than that of the opening 3f, prevents the bracket 2 from leaving the upright 3 since the faces 2t and 2u abut against the free, inner ends of the curved profile edges 3d and 3e. In addition, bracket 2 is retained vertically on the upright 3 by the bearing faces 2r and 2s which penetrate respectively inside a corresponding notch 3g made in the curved-profile edges 3d and 3e of the flanges 3b and 3c.

Figure 6:
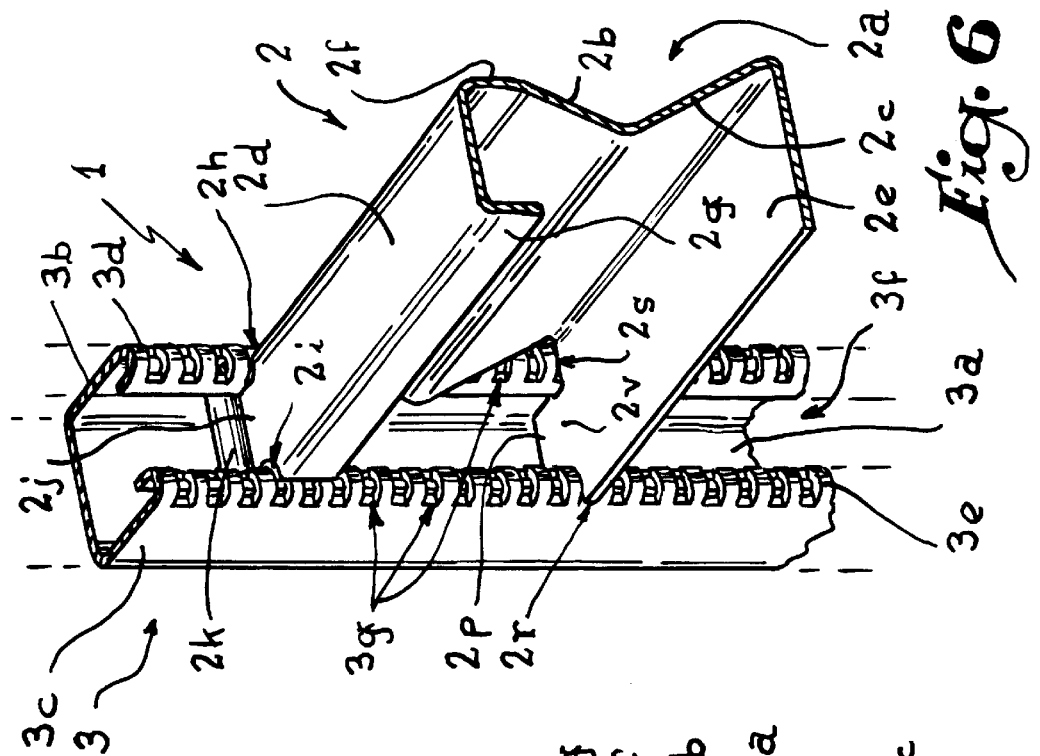
FIG. 6 is a view in perspective showing the securing device in assembled position.

It will be noted that the distance between the retaining fingers 2n and the lower flange 2e is a multiple of the distances separating two notches 3g of the same curved-profile edge of the upright 3 (FIG. 6).

In addition, it will be noted that the width of the branch 2j and of the segment 2v is slightly less than that of the opening 3f in order to allow the inclined introduction of the bracket 2 inside the upright 3. The branch 2j and the segment 2v allow a lateral hold of the bracket 2 inside the upright 3 since they come near the curved-profile edges 3d and 3e of the flanges 3b and 3c.

It will also be observed that the lower flange 2e is substantially wider than the upper flange 2d.

It must, moreover, be understood that the foregoing description has been given only by way of example and that it in no way limits the domain of the invention which would not be exceeded by replacing the details of execution described by any other equivalents.

What is claimed is:

1. A support apparatus for supporting cable ways and other conduits for conveying energy or fluids, the support apparatus comprising:
    an upright member having a web from which extends a pair of spaced flanges including curved end portions which define an elongated opening therebetween and which curved end portions include free ends oriented inwardly of said upright member and toward said web;
    a plurality of spaced notches in each of said curved end portions of said flanges of said upright member;
    at least one bracket member having an upper first and a lower second retainer means extending therefrom, said first retainer means including a first portion of a size to be extended between said elongated opening to engage said free ends of said flanges of said upright member, and said second retainer means being spaced from said first retainer means and including a first portion of a size to be received within said elongated opening; and
    each of said first and second retainer means including second portions for being seated within said notches whereby said first and second retainer means secure said at least one bracket to said upright member whereby said bracket is adapted to be tipped downwardly after the first portion of said first retainer means is inserted within said upright member to engage the second portion of said first retainer means and said second retainer means to said upright member.

2. The support apparatus of claim 1 in which said notches are formed within said curved end portions of said flanges of said upright member so as to be spaced from said free ends thereof.

3. The support apparatus of claim 1 wherein said notches in said curved end portions of one of said flanges are generally parallel with said notches in said curved end portions of the other of said flanges of said upright member.

4. The support apparatus of claim 1 in which each of said first portions of each of said first and second retainer means is of a width which is greater than a width of said elongated opening between said flanges of said upright member.

5. The support apparatus of claim 4 in which said second portion of said first retainer means includes a pair of finger elements which extend from said at least one bracket member in spaced relationship with respect to said first portion of said first retainer means, said finger elements being seated within said notches in said curved end portions of said flanges of said upright member.

6. The support apparatus of claim 5 wherein said first portion of said first retainer means includes a curved stop member which is of a width greater than the width of said elongated opening between said curved end portions of said flanges of said upright member whereby said stop member is adapted to be insertable when in a first orientation into said elongated opening and thereafter re-oriented so that said stop member abuts said free ends of said spaced flanges of said upright member.

7. The support apparatus of claim 6 in which said at least one bracket member includes first and second spaced flange members which are connected by a panel member, a return lip extending from said first flange member in spaced relationship to said panel member, said stop member extending from one end of said first flange member and said finger elements extending from adjacent said one end of said first flange member, and one of said finger elements extending from said return lip and the other finger element extending from said panel member.

8. The support apparatus of claim 7 including a pair of spaced notches formed in said first flange member of said at least one bracket intermediate said stop member and said finger elements, said notches being spaced substantially at a distance with respect to one another equal to the width of said elongated opening between said flanges of said upright member.

9. The support apparatus of claim 7 in which said first portion of said second retainer means includes an outwardly extending lug which is generally T-shaped in profile, said second portion of said second retainer means including a pair of bearing surfaces which are seated within a pair of horizontally aligned notches of said plurality of spaced notches of said flanges of said upright member and which extend from said second flange member, and said lug extending outwardly between said bearing surfaces.

10. The support apparatus of claim 9 in which said lug defines inwardly extending faces adjacent said pair of bearing surfaces which are engageable adjacent said free ends of said flanges of said upright member.

11. The support apparatus of claim 10 wherein said finger elements are spaced a distance from said second flange member of said at least one bracket which is greater than a distance between adjacent notches along one of said flanges of said upright member.

12. The support apparatus of claim 1 in which said first portion of said second retainer means includes an outwardly extending lug which is generally T-shaped in profile, said second portion of said second retainer means including a pair of bearing surfaces which are adapted to be seated within said notches of said flanges of said upright member, and said lug extending outwardly between said bearing surfaces.

13. The support apparatus of claim 12 in which said lug includes a portion which is wider than the width of said elongated opening between said flanges of said upright member such that said lug is adapted to be forced between said curved end portions of said flanges of said upright member.

14. The support apparatus of claim 13 in which said second portion of said first retainer means includes a pair of finger elements which extend from said at least one bracket member in spaced relationship with respect to said first portion of said first retainer means, said finger elements being seated within said notches in said curved end portions of said flanges of said upright member.

15. The support apparatus of claim 13 wherein said first portion of said first retainer means includes a curved stop member which is of a width greater than the width of said elongated opening between said curved and portions of said flanges of said upright member whereby said stop member is adapted to be inserted when in a first orientation into said elongated opening and thereafter re-oriented so that said stop member abuts said free ends of said flanges of said upright member.

* * * * *